United States Patent [19]

Huntley et al.

[11] 4,116,754

[45] Sep. 26, 1978

[54] METHOD OF FORMING MATT DISPLAY ELECTRODE

[75] Inventors: Frank Alfred Huntley, Porchester; William Morris Morgan, Chandler's Ford, both of England

[73] Assignee: International Business Machines Corporation, Armonk, N.Y.

[21] Appl. No.: 831,218

[22] Filed: Sep. 7, 1977

[30] Foreign Application Priority Data

Sep. 30, 1976 [GB] United Kingdom ............... 40575/76

[51] Int. Cl.$^2$ ............................................. C23F 1/00
[52] U.S. Cl. ................................... 156/656; 156/667; 252/79.3
[58] Field of Search ............... 427/309, 399; 350/129; 156/638, 665, 667, 656; 134/3, 41; 252/79.2, 79.3; 204/14 R, 23, 27, 33, 42

[56] References Cited

U.S. PATENT DOCUMENTS

| 2,193,711 | 3/1940 | Burnham | 156/665 X |
|---|---|---|---|
| 3,851,950 | 12/1974 | Andres et al. | 156/665 X |

FOREIGN PATENT DOCUMENTS 709,391  5/1954  United Kingdom ..................... 427/309

*Primary Examiner*—William A. Powell
*Attorney, Agent, or Firm*—Hansel L. McGee

[57] ABSTRACT

A method for preparing matted display electrodes is provided. The electrodes are initially chemically treated in a solution to form a compound on said electrodes which is insoluable in said solution. Finally, the electrodes treated in a second solution which dissolves said compound.

9 Claims, No Drawings

METHOD OF FORMING MATT DISPLAY ELECTRODE

BACKGROUND OF THE INVENTION

1. Field of the Invention

This invention relates to display electrodes for electrically driven display devices of the kind in which display electrodes are normally visible but are obscured when energized to provide a display.

2. Description of the Prior Art

Display electrodes herein described are to be found in, for example, flat panel display devices wherein the display effect is achieved by the interaction of a voltage or electric current with a medium, for example, displays using electrochromism, plating out metals from suspension, or liquid crystals. The electrodes are usually deposited on a flat substrate by evaporation, which results in a highly reflective element. Especially in passive displays, in which light is not generated by the display, electrodes with this characteristic is undesirable since the contrast between the generated display and the remainder of the display area is not good.

It should be pointed out that the treatment of aluminium in a way similar to that described hereinafter is not new. British Patent Specification No. 396,204 describes a method of producing a dense white coating on aluminum articles, for decorative purposes, by forming an adherent oxide coating and then removing the "colored constituents" without the use of external electric energy. The oxide coating may be produced by subjecting the aluminium surface to the action of a solution of an alkali carbonate and a soluble dichromate, preferably hot to obtain a coating of a greater density and thickness. Solutions of nitric acid or of nitric and sulphuric acids are preferred for removing the colored constituents. Hydrofluoric acid is preferred to treat an anodically formed oxide coating. This specification does not teach the removal of the oxide coating, and, on the contrary, states that a thick oxide coating is preferred. British Patent Specification No. 709,391 relates to a method for the surface treatment of aluminium in order to obtain a better degree of adhesion for coating, for example, lacquer. The method comprises forming a oxide layer by treatment in an aqueous solution containing caustic alkalis and soluble chromates and at least partially dissolving the oxidic layer in a second solution which is capable of dissolving trivalent chromium oxides. The specification is not concerned with the appearance of the aluminium and, like British Pat. specification No. 396,204, does not teach a way of achieving good contrast between the selected and unselected electrodes of an electrically driven display device.

SUMMARY OF THE INVENTION

It is the object of the invention to improve the contrast between energized and unenergized display electrodes by providing a matt display electrode, i.e., an electrode with a dull substantially non-reflecting surface.

This is achieved by roughening the surface of the electrode by a self-limiting chemical treatment which results in a very high degree of scattering of incident light and which can be used on thin metal films.

Accordingly the invention provides a method of of improving the optical contrast between energized and unenergized display electrodes used in an electrically driven display device of the kind in which display electrodes are normally visible but are obscured when energized, the method comprising a chemical treatment including a first step of subjecting at least the visible surfaces of the electrodes to the action of a solution which combines with the material of the electrode to form a compound insoluble in the solution, and a second step of subjecting the compound to the action of a second solution which dissolves only the compound, thereby roughening the surface of the electrodes and providing a matt appearance.

The treatment is self-limiting since the first step continues only as long as there is a region of the electrode surface on which the compound has not formed.

PREFERRED EMBODIMENTS OF THE INVENTION

A metal commonly used in display electrodes is aluminium. Implementation of the invention in this case comprises a first step of subjecting the aluminium surface to the action of an oxidizing solution of chromium trioxide and sulphuric and nitric acids. On the surface a layer of aluminium oxide-hydroxide is formed which is insoluble in the solution. After rinsing, the second step is that of subjecting the electrode surface to the action of an oxide etch solution of buffered hydrofluoric acid with a reducing agent, for example hypophosphite, which prevents excessive attack on the aluminium metal. The electrodes are preferably immersed in the solutions. The duration of each step depends on the strengths of the solutions used and preferred values are given in the Examples. It is preferable, however, to repeat the treatment at least three times and we have found that a larger number of treatments, with relatively short treatment steps, gives better results than fewer treatments with longer treatment steps. Short treatment steps may last up to 30 seconds. Longer treatment steps may last up to 3 minutes. The result is a highly roughened surface, providing excellent scattering of incident light, which gives the electrode surface a matt appearance. An important advantage of the treatment is that if aluminium is not the desired electrode surface material because of disadvantageous electric or chemical reactions with the display medium, an aluminium conductor can be coated by vacuum deposition to a depth of up to one micron with a suitably inert material, such as silver, platinum, rhodium or ruthenium, without affecting the surface texture and thus the reflectivity of the electrode.

Copper can be treated by a first step of subjecting the surface to a potassium-iodide and iodine solution which converts the surface to copper iodide which is insoluble in the solution and can be removed by the application of thiosulphate solution. This should only be used with relatively thick electrodes since a substantial layer of copper is removed by the treatment.

EXAMPLES

The following examples are by way of illustration and is in no manner restrictive of the present invention.

EXAMPLE I

The display electrodes were of aluminium, 7500 Angstrom thick, supported on a glass substrate. The coated substrate was cleaned in a detergent solution, rinsed and then immersed in a 5% phosphoric acid solution for 1 to 2 minutes until uniform wetting was achieved. After rinsing, the substrate was immersed for 2 minutes in an oxidizing solution of chromium trioxide 100 gm, nitric acid 50 ml., sulphuric acid 50 ml., and water to 1 liter. The substrate was then, after rinsing, immersed for 1 minute in an oxide etch solution of 40% Ammonium fluoride 500 ml, 48% hydrofluoric acid 100 ml., and sodium hypophosphite 5 gm. After rinsing and drying the substrate, the treatment was repeated three times resulting in a surface having very little reflectivity. The oxidizing and oxide etch solutions were at room temperature (20° C.).

EXAMPLE II

Display electrodes similar to those used in Example I, were treated similarly using the same pre-wash technique, oxidizing and oxide etch solutions. However, the immersions in each solution were only for 15 to 20 seconds and the treatment was repeated 5 times with only rinsing between each step. About 5000 Angstrom of aluminium was found to have been removed and the surface exhibited very little reflectivity even at shallow angles of incidence.

Using the matt electrode prepared according to Example II, an electrically and chemically inert display electrode was made by coating with silver. First, about 200-300 Angstrom of aluminium was evaporated on to the electrode, then about 300-400 Angstrom of aluminium and silver together, and finally 3000-5000 Angstrom of silver. No change in the surface texture was observed and the finished electrode had a matt appearance, rather whiter than the original due to the presence of the silver.

What is claimed is:

1. A method of improving the optical contrast between energized and unenergized display electrodes used in an electrically driven display device of the kind in which display electrodes are normally visible but are obscured when energized, the method comprising a chemical treatment including steps of;
    (a) of subjecting at least the visible surfaces of aluminum electrodes to the action of a solution which combines with the material of the electrode to form a compound insoluble in the solution, said mixture being an aqueous solution of a mixture of chromium trioxide, nitric acid, and sulfuric acids; and
    (b) subjecting the compound to the action of a second solution, said solution dissolves only the compound, comprising buffered hydrofluoric acid and a reducing agent thereby roughening the surface of the electrodes and providing a matt appearance.

2. A method as claimed in claim 1, wherein the reducing agent is sodium hypophosphite.

3. A method as claimed in claim 1 wherein steps (a) and (b) each last for a time in the range 15 to 20 seconds, and the steps are sequentially repeated.

4. A method as claimed in claim 1, wherein the treatment is applied to electrodes which have been deposited on a supporting glass substrate.

5. A method of improving the optical contrast between energized and unenergized display electrodes used in a electrically driven display device of the kind in which display electrodes are normally visible but are obscured when energized, including the steps of:
    (a) cleaning aluminium display electrodes supported on a glass substrate in a detergent solution,
    (b) rinsing said cleaned electrodes,
    (c) immersing the electrodes in a 5% phosphoric acid solution for about 1 to 2 minutes to obtain uniform wetting,
    (d) rinsing the so treated electrodes,
    (e) immersing said electrodes in an oxidizing solution containing 100 gm of chromium trioxide, 50 ml. of $HNO_3$, 50 ml. of $H_2SO_4$ and sufficient ater to obtain 1 liter of solution for about 2 minutes,
    (f) rinsing the electrodes,
    (g) immersing said electrodes in an oxide etch solution containing 500 ml. of a 40% $NH_4F$ solution, 100 ml of 48% HF acid and 5 gram of sodium hypophosphite acid,
    (h) rinsing and drying the so treated electrodes.

6. A method according to claim 5 wherein the steps (a) through (h) are repeated 3 times.

7. A method according to claim 5 wherein the steps (a) through (h) are repeated 5 times.

8. A method according to claim 7 wherein there is added the step of vacuum depositing an inert metal on said treated electrodes, said metal having a thickness of up to about 1 micron.

9. A method according to claim 8 wherein said inert metal is Ag having a thickness of from about 3000Å to 5000Å.

* * * * *